Oct. 3, 1961 C. G. THORNTON 3,002,271

METHOD OF PROVIDING CONNECTION TO SEMICONDUCTIVE STRUCTURES

Filed June 8, 1956

INVENTOR.
CLARENCE G. THORNTON

BY

ATTORNEY 3,002,271
Patented Oct. 3, 1961

3,002,271

METHOD OF PROVIDING CONNECTION TO SEMICONDUCTIVE STRUCTURES

Clarence Gould Thornton, Lansdale, Pa., assignor to Philco Corporation, Philadelphia, Pa., a corporation of Pennsylvania Filed June 8, 1956, Ser. No. 590,204
3 Claims. (Cl. 29—488)

The present invention relates to methods for the fabrication of semiconductive devices, and particularly to methods for providing connections of low thermal impedance to the collector elements of power transistors.

Semiconductive devices are known in the prior art which employ so-called alloy-junctions as the active elements thereof, for example as the emitter or collector elements of transistors. Such alloy-junctions may be fabricated by applying a body of suitable activator metal to the surface of a semiconductive body of predetermined conductivity-type, and then heating the metal sufficiently to cause it to melt and to alloy with the underlying portion of the semi-conductive body. Upon subsequent cooling and solidification, the semiconductive material in the alloy region recrystallizes upon the undissolved portion of the semiconductive body, the recrystallized semiconductive material then containing minute traces of the activator metal sufficient in quantity and type to alter the conductivity type of the recrystallized region and to form a P-N junction and a rectifying barrier adjacent the inner boundary of the recrystallized region. Most of the activator metal solidifies in a body integral with, and on the external side of, the recrystallized region, this metal body then serving ordinarily as the contact for the junction. Customarily a lead is then attached to this metal contact to provide connection to external circuit elements. In the case of the transistor, a second alloy-junction is formed in similar manner in an opposing surface region of the semiconductive body, so as to produce a pair of confronting rectifying barriers within the body.

While such devices of the prior art have been highly successful when operated at low powers, the maximum operating power of such devices has heretofore been limited to relatively low values in many applications because of the quantity of heat which is generated at the junctions, particularly at the collector junction in the case of the transistor. The severity of this power limitation will be more fully appreciated when it is realized that, when using germanium as the semiconductive material, the temperature of the semiconductive body typically should at no time exceed about 100° centigrade lest the operating characteristics of the device be impaired, while in many important applications, such as in automobile radio circuits, it is not uncommon for the ambient temperature of the region in which the transistor is operated to be as high as about 65° centigrade. In such cases, the maximum permissible rise in temperature at the collector junction of the transistor is only about 35° centigrade, and the maximum power which may be dissipated in the transistor under these conditions is equal to the number of watts which will produce a 35° centigrade rise in temperature at the collector junction. Thus, the maximum operating power of a transistor is limited by the temperature rise produced at the collector junction for each watt of dissipated power. In a typical prior art transistor in which each watt of power dissipated at the collector junction produces a temperature rise of about 5° centigrade at the junction, the maximum permissible collector dissipation under the foregoing conditions is about 7 watts. In order to permit high levels of operation, it is therefore necessary to reduce as much as possible the temperature rise at the collector junction per watt of power dissipated therein, the maximum power being substantially proportional to this factor.

In the past, efforts to reduce the temperature rise per watt at the collector junction have included the use of connections to the collector contact which have large cross-sectional areas and high thermal conductivities, the use of large-area radiating fins on the collector connections, the use of liquid coolants for the collector connections, and the use of collector connections penetrating into the collector contacts to achieve closer thermal connection with the collector junctions. While these constructions have been of some efficacy in permitting increased operating powers for transistor devices, they have not heretofore provided as great a reduction in temperature rise per watt at the collector junction as is desirable in many applications. Furthermore, in the case in which a collector connection is forced into the collector contact, difficulties have been encountered in forcing the collector member sufficiently close to the recrystallized region without creating the hazard of either damaging the semiconductive device by the applied pressure or short-circuiting or otherwise deleteriously affecting the electrical properties of the collector junction by the extrusion of the displaced contact material toward or beyond the periphery of the recrystallized region defining the junction area.

In addition, it is known to minimize the temperature rise of the collector junction per watt of dissipated power by using a collector junction of as great area as possible. However, very substantial difficulties and disadvantages are encountered when the collector area is increased beyond certain practical limits. For example, as the area of an alloy junction is made greater, the probability that the junction will contain imperfections increases markedly. One common form of such imperfection is known in the art as an "island," a localized region in which junction formation does not occur properly, generally because the activator metal has failed to wet the semiconductive material adequately in that region during the alloying process. Such defects tend to increase the collector saturation current $I_{co}$ of the transistor even beyond the relatively large value inherently produced by the large junction area. Such large values of $I_{co}$ not only represent wasted power in a device, but, because $I_{co}$ increases very rapidly with increases in temperature, also tend to limit the maximum operating power. The use of exceptionally large junction areas also increases the collector capacity, and thus reduces the maximum operating frequency of the device. For these and other reasons the expedient of merely increasing indefinitely the collector junction area does not provide a satisfactory solution to the problem of power dissipation of such devices, and, in general, it is highly desirable to be able to increase the maximum permissible operating power while using relatively small junction areas.

Accordingly, it is an object of the invention to provide an improved method for the fabrication of semiconductive devices.

Another object is to provide an improved method for forming a collector connection to the collector junction of a transistor device.

Another object is to provide a method for constructing an alloy-junction device characterized by a particularly low temperature rise per unit of heat energy dissipated in the region of the junction.

Still another object is to provide an improved method for making a connection of low thermal impedance to the recrystallized region adjacent an alloy junction.

A further object is to provide an improved method for fabricating a power transistor of increased maximum power dissipation.

In accordance with the invention, the above-mentioned objectives are achieved by the provision of a process in which the metallic portion of an alloy-junction contact is removed substantially completely from the recrystallized region, and a heat-dissipative member of high thermal conductivity is then applied in intimate thermal contact with a major fraction of the area of the recrystallized region. In one form of the invention, the solid metallic contact formed on the recrystallized region during alloying is heated above its melting point, and, while the metal is in liquid form, a heat-dissipating member comprising a material of high thermal conductivity and having a cross-sectional area such as to fit just within the periphery of the recrystallized region is placed against the liquid contact and urged toward the recrystallized region. In this form of the invention, the heat-dissipating member is provided with surfaces which are readily wet by the liquid metal of the contact and, as a result, as soon as the heat-dissipating member is placed against the molten metal of the contact, the latter metal flows rapidly along the sides of the heat-dissipating member and away from the recrystallized region. As the metal of the original contact is thus removed from the recrystallized region, the heat-dissipating member moves into substantial contact with the recrystallized region, in response to the above-mentioned urging. Upon subsequent cooling, the small amount of metal remaining between the heat-dissipating member and portions of the recrystallized region serves as a solder to bond the recrystallized region and the heat-dissipating member together in intimate thermal contact. The melted metal which has travelled along the lateral surfaces of the heat-dissipating member then solidifies in its new position, safely removed from the periphery of the recrystallized region.

In a preferred embodiment, the readily wet surfaces for the heat-dissipating member are provided by coating the member with a metal at least partly constituted of the same material as the material of the original collector contact, and preferably containing also another ingredient causing the coating to have a melting point somewhat lower than that of the contact material. Because of its lower melting point, this coating may readily be caused to melt before the contact, and to dissolve some of the contact material before the entire contact becomes molten. The net effect of this operation is to cause the contact material to be converted to liquid form less rapidly than otherwise, so that the heat-dissipating member moves more smoothly and more gently against the recrystallized region in response to the urging forces applied thereto. This latter feature is of particular utility where the force urging the heat-dissipating member against the collector contact is a gravitational force produced by supporting the weight of the heat-dissipating member upon the collector contact.

In another form of the invention, the material of the original contact is removed by first melting it, and then causing the liquid contact material to flow off onto an auxiliary surface before the heat-dissipating member is applied to the recrystallized region. For example, after the contact has been melted, an appropriately-tinned hot wire having surfaces readily wet by the material of the contact may be applied to the molten contact, whereupon the material of the contact will flow rapidly onto the lateral surfaces of the wire and away from the recrystallized region. After removing the wire, the heat-dissipating member described hereinabove may be soldered to the recrystallized region in any convenient manner.

In another form of the invention, the material of the original collector contact may be removed without melting it, by subjecting it to etching in a solution which selectively attacks the material of the contact without attacking the semi-conductor of the recrystallized region. A suitable soldered connection of low thermal impedance may then be provided between the heat-dissipating member and a major fraction of the exposed recrystallized region.

In each of these forms of the invention, the heat-dissipating member of high thermal conductivity and relatively large cross-sectional area is placed in intimate thermal contact with the recrystallized region of the collector junction, thereby providing most effective removal of the heat generated in this region and increasing the power capabilities of the transistor. Furthermore, the fabrication method described may be performed easily, quickly and reproducibly, without danger of deleteriously affecting the semi-conductive base element or short-circuiting the collector junction during the process. The method of the invention therefore makes possible mass production of power transistors of unusually high maximum power dissipations with a high degree of reproducibility.

Other objects and features of the invention will be more readily understood from a consideration of the following detailed description, taken in connection with the accompanying drawings, in which.

Figure 1:
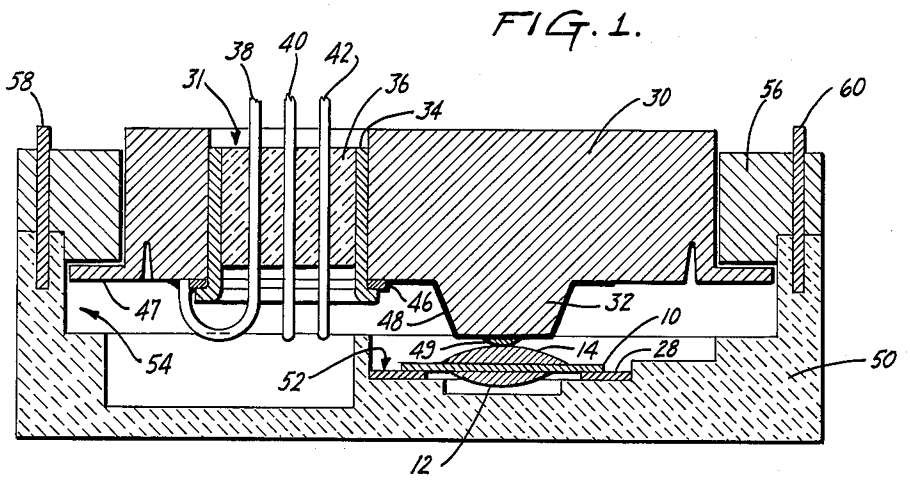
FIGURE 1 is a cross-sectional view showing an arrangement of apparatus for practising the invention in one form.

Referring now particularly to FIGURE 1, there is shown therein a thin wafer of semiconductive material 10, which may be of germanium, having on opposed surface regions thereof an alloyed emitter contact 12 and an alloyed collector contact 14. As is normally the case in alloy-junction transistors, the contacts 12 and 14 are composed of the same activator metal which has been alloyed with the underlying regions of the semiconductive body 10. It will be understood that, in the process of alloying, a portion of the semiconductive body is dissolved by the molten metal but, upon subsequent cooling and solidification, the semiconductive material recrystallizes in single-crystalline form and with small amounts of the activator metal interspersed therethrough, whereby the conductivity type of the recrystallized region is made opposite to that of the original semiconductive body. Thus, as is shown more clearly in FIGURE 2 and particularly clearly with respect to the emitter element in that figure, in the fabrication of the alloy junctions which precedes the present process the semiconductor has been dissolved by the emitter and collector activator metals to depths indicated by the dotted lines 16 and 18, respectively, and upon subsequent cooling the emitter and collector recrystallized regions 20 and 22, respectively, have been formed having a conductivity-type opposite to that of the intervening semiconductive material 24. The inner boundaries 16 and 18 of the recrystallized regions 20 and 22 then correspond to the positions of the emitter and collector junctions, respectively. During the same cooling and solidification process, the emitter and collector contacts 12 and 14 have also been formed integral with the recrystallized region of the semiconductive body, and are composed substantially entirely of the original activator metal.

In one example, the semiconductor wafer 10 may be rectangular in form, and an appropriate ohmic base connection is provided thereto. In the form shown in the figures, the base connection is provided by a rectangular base tab 28 of larger outside dimension than the semiconductive body 10, which tab is soldered to the emitter side of body 10. As shown, the base tab 28 is also provided with a central aperture through which the emitter contact 12 protrudes, to prevent short-circuiting of the emitter element to the base element.

External connection to the collector recrystallized region, and hence to the collector junction, of the transistor is in this case to be made by way of the heat-dissipating member 30, which is of large cross-sectional area and high thermal conductivity. Heat-dissipating member 30 is provided with a protruding boss or stud 32 in the form of a truncated cone, the flat area of the truncation being substantially the same in configuration and size as that of the collector recrystallized region, although slightly smaller, as shown. It is this latter flat surface which is used to make intimate contact to the collector recrystallized region in accordance with the invention, as described hereinafter.

The heat-dissipating member 30 is not only adapted to provide the desired rapid conduction of heat away from the collector recrystallized region of the transistor, but also in this case is arranged to serve as a support upon which the complete transistor, including the leads thereof, may be mounted. Thus, a cylindrical opening 31 extends through member 30 and is provided with a metal eyelet 34, containing a glass bead 36. Bead 36 is traversed by the three metal lead wires 38, 40 and 42 which serve as the external lead connections for the collector, emitter and base elements of the transistor, respectively. Preferably the glass bead 36 is molded into eyelet 34 in a manner to provide a hermetic seal therewith, and a metal sealing ring 46 is bonded to the main body of the heat-dissipating member 30 and to the eyelet 34, as by soldering, to provide a hermetic seal between these elements. Preferably the heat-dissipating member 30 is generally cylindrical in form, and is provided with a peripheral, circular flange 47 to which a covering cap enclosing the active elements of the transistor may be secured, as will be described hereinafter with reference to FIGURE 3.

In the step of fabrication illustrated in FIGURE 1, the stud 32 rests upon the solid collector contact 14. For reasons which will be set forth in detail hereinafter, member 30 is provided with a metal coating 48 covering the end and sides of stud 32, as well as a small portion of the adjoining surfaces of member 30, and a metal pellet 49 is provided on the end of stud 32 and in contact with collector contact 14. Preferably the stud 32 is exactly concentrically aligned with the collector recrystallized region of the transistor, a condition which may be achieved by manual manipulation, or by positioning with the aid of a micro-manipulator together with appropriate microscopic examination. In the arrangement shown in FIGURE 1, such location of the heat-dissipating member 30 is facilitated by the use of a suitable jig 50, which may be of an inert material such as carbon, for example, and which is provided with a shouldered, recessed region 52 into which the base tab 28 may be fitted, and with another shouldered region 54 into which the peripheral flange 47 of the heat-dissipating member 30 may be fitted. Approximate alignment between the stud 32 and the collector recrystallized region is then readily obtained by placing the base tab 28, together with the attached transistor, into the locating recess provided therefore, and then gently placing the heat-dissipating member 30 in the recess provided for it so that the stud 32 rests upon the center of the collector contact 14 as shown. A split ring 56, also of an inert material and held to jig 50 by pins such as 58 and 60, may then be placed in position, loosely-fitted around the main cylindrical position of member 30 as shown, thereby to hold the member 30 with its axis vertical while permitting member 30 to move easily in the vertical direction.

As has been pointed out hereinbefore, in accordance with one procedure of the prior art it would be possible to secure stud 32 to the collector contact 14 by soldering in conventional manner. However, in a structure produced in this manner the temperature drop between the collector junction and the stud 32 is high, due to the substantial thermal impedance of the collector contact 14. The temperature rise of the collector junction per dissipated watt is therefore also relatively large and the maximum permissible operating power of the resultant transistor device is therefore undesirably low. In accordance with another procedure of the prior art, it is possible to force the stud 32 into collector contact 14, the material of contact 14 having been softened to facilitate such penetration by warming it to a temperature below its melting point. However, where, as is usually desired for best heat conduction away from the collector junction, the stud 32 has a surface area nearly as great as that of the collector recrystallized region, forcing of the stud through the contact and close to the recrystallized region requires that substantially all of the material of contact 14 be extruded beyond the periphery of the stud to the periphery of the collector recrystallized region. With such a procedure, the hazard of causing some of the extruded material to extend beyond the edge of the recrystallized region is great, and the danger of short-circuiting the junction is substantial. In addition, relatively large pressures, which may damage the transistor structure, are generally necessary to effect such extrusion.

In accordance with the method of the invention in one form, before application thereof to collector contact 14, the stud 32 and adjacent portions of heat-dissipating member 30 are provided with surfaces which are readily wet by the metal of contact 14. This may be accomplished by applying a suitable flux to the surfaces to be made readily wettable, and then applying to the fluxed surfaces the coating 48 of a material containing the same metal as that of contact 14, and preferably also containing another metal serving to lower the melting point of the material. The coating material is also preferably one in which the metal of contact 14 is readily soluble. For example, where the collector contact 14 is of indium, the stud 32 may be provided with a thin coating of indium-cadmium alloy in eutectic proportions. Furthermore, in a preferred embodiment a pellet 49 of the same material as coating 48 is also applied to the flat end of stud 32 prior to placing the assembly in the position shown in FIGURE 1.

Stud 32, precoated and provided with the pellet 49, is then placed against the collector contact 14 as shown in FIGURE 1, and the entire assembly heated to melt the coating 48 on stud 32, the pellet 49 and the collector contact 14. As soon as contact 14 becomes liquid, the liquid contact material immediately flows upward along the sides of the stud 32, covering the precoated surfaces of member 30. Simultaneously, member 30 moves downward under its own weight to a position in which stud 32 is in substantially direct contact with the collector recrystallized region. In the preferred form in which the coating 48 on stud 32 and the pellet 49 have lower melting points than the material of contact 14, the coating and the pellet melt and dissolve some of the contact material before the contact itself melts, so that the liquefication and removal of the contact material, and the downward motion of stud 32, are less abrupt than otherwise, thereby providing a smoother and gentler removal of the contact material and advance of the stud against the recrystallized region.

The assembly is then cooled to solidify the molten metal, whereby the stud 32 is soldered in its position on the recrystallized region. The resultant structure may then be cleaned by electrolytic etching in a stream of electrolyte, rinsed with water, dried in warm air and enclosed in a hermetically-sealed container.

Figure 2:
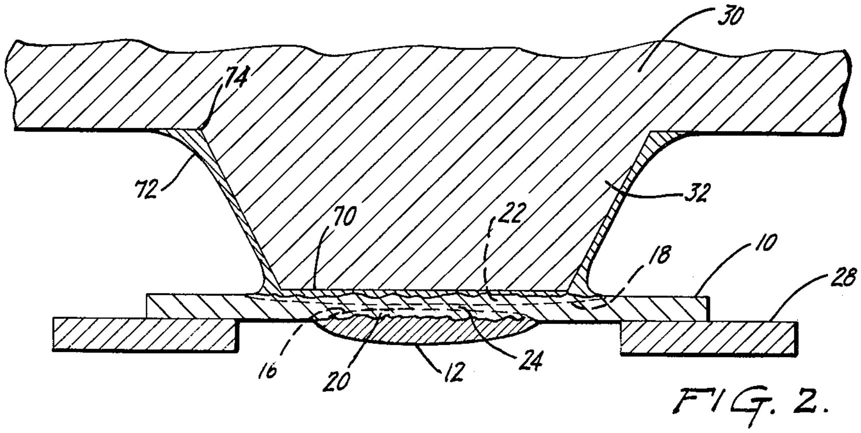
FIGURE 2 is an enlarged cross-sectional view of a portion of the arrangement shown in FIGURE 1, as it appears at a later stage in a process according to the invention.

The details of the resulting structure in the vicinity of the active region of the resultant transistor are shown in the enlarged view of FIGURE 2. As shown, the flat surface 70 of stud 32 is substantially in direct contact with the recrystallized region 22 of the collector, while the material 72 which formerly constituted contact 14 is now disposed along the lateral surfaces of the stud and along the adjacent surfaces of member 30, collecting principally about the region 74 where the stud 32 joins the main body of the heat-dissipating member 30. The resultant intimate thermal connection of the stud 32 to the recrystallized region 22 then provides rapid removal and dissipation of heat generated at the collector junction during subsequent operation of the transistor, and an extremely small temperature drop between the collector junction and the heat-dissipating member 30, per watt of power dissipated at the collector junction.

Without thereby limiting the scope of the invention, the following detailed description of how the invention has been applied in one particular case is presented in the interest of complete definiteness. In one example, the device to which the collector connection was to be made included a rectangular wafer of N-type germanium as the body 10, into opposite faces of which circular dots of indium metal were alloyed at a temperature of about 500° C. The original thickness of body 10 was about 5 mils, and the alloying was such as to form emitter and collector junctions 16 and 18 spaced from each other by about 1 mil. In this case the diameter of the collector recrystallized region was about 120 mils, while that of the emitter was about 80 mils. The base tab 28 was soldered to body 10 with a solder consisting of tin, which melted at a temperature of about 232° C. This P-N-P transistor structure, minus collector, emitter and base leads, was then located in a jig such as 50 in FIGURE 1, and the heat-dissipating member 30 was prepared for application to the collector contact.

The heat-dissipating member 30 in this case was composed of copper, in substantially the form shown in FIGURE 1. The flat surface of the stud 32 was circular and had a diameter of about 110 mils. Eyelet 34 was of steel, while the sealing ring 46 was of nickel. Collector, emitter and base leads 38, 40 and 42 were of Dumet, molded into the glass bead 36. Prior to insertion of the glass bead 36 into eyelet 34, the entire heat-dissipating member 30, and the eyelet 34, were in this case plated with nickel as a precaution against possible contamination of the transistor by copper oxides; however, this is not an essential step so long as the exposed copper surfaces are substantially free of copper oxides during the fabrication process. Collector lead 38 was then soldered to the heat-dissipating member 30 with a lead-tin solder.

Next the flat surface and the lateral surfaces of stud 32, as well as the adjacent surrounding surfaces of member 30, were brushed with a flux consisting of zinc chloride, and were then coated with a thin layer of indium by heating member 30 on a hot plate to a temperature above the melting point of indium, applying indium to the stud 32, and allowing the melted indium to run over the fluxed surfaces. The stud 32 was then cooled to about 110° C. and the pellet 49 of indium-cadmium was tacked onto the flat end of the stud during this cooling step by placing the pellet on the stud when the temperature had fallen to about 123° C. The heat-dissipating member 30 was then placed in the position shown in FIGURE 1, so that the stud 32, bearing the coating 48 and the pellet 49, rested against the center of collector contact 14, substantially as shown. The entire assembly of FIGURE 1 was then immersed in a bath consisting of propylene glycol and ½% of indium trichloride, maintained at a temperature of between 160° C. and 180° C., until contact 14 melted and stud 32 moved against the recrystallized region. The assembly was then removed and allowed to cool at room temperatures.

Figure 3:
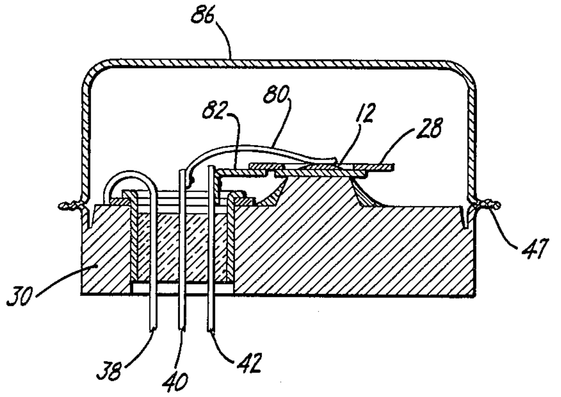
FIGURE 3 is a cross-sectional view of a power transistor fabricated in accordance with the invention.

Referring now to FIGURE 3, a connection in the form of a narrow metal ribbon 80 of nickel was then soldered to the emitter contact 12 with indium-cadmium eutectic solder, the other end of ribbon 80 then being spot-welded to lead wire 40. Similarly, a second metal ribbon 82 was soldered to the base tab 28, and spot-welded at its other end to the base lead wire 42. The entire assembly was then cleaned by electrolytic etching in a stream of sodium hydroxide, followed by rinsing with pure water. The covering member 86, preferably also of nickel-plated copper, was then cold-welded to flange 47 in an atmosphere of dry air.

The resultant power transistor was characterized by a temperature drop of about 0.6° centigrade between the collector junction and the heat-dissipating member 30, providing a maximum collector dissipation of at least 55 watts even in ambient temperatures of as high as 65° C., and of at least 110 watts at ambient temperatures of about 30° C.

In another form of the invention, the metal of contact 14 is removed before the heat-dissipating member 30 is applied to the recrystallized region by melting the contact material and touching it with an auxiliary member having surfaces readily wet by the contact material, after which the heat-dissipating member is applied to the exposed recrystallized region. For example, a hot wire coated with indium-cadmium eutectic solder may be touched to the molten contact material, whereby the material is caused to flow rapidly along the wire and away from the recrystallized region. The wire may then be removed and a heat-dissipating collector connection such as member 30 soldered directly to the recrystallized region. The subsequent steps in producing a complete transistor may be generally similar to those described hereinbefore with reference to FIGURE 3.

In another embodiment of the invention the collector contact may be completely removed from the recrystallized region prior to application of member 30 by etching it with a substance which selectively attacks the material of the contact 14 without attacking the recrystallized region of the germanium. Many materials are suitable for this purpose, one of them being hydrochloric acid which will dissolve an indium collector contact without adversely affecting the germanium of the collector recrystallized region. After removal of the contact 14 by the hydrochloric acid, the entire device is preferably cleaned by immersion in a CP–4 etch, and the subsequent procedure is then similar to that described hereinbefore with respect to preceding embodiments of the invention.

The method of the invention may also be applied to the provision of a connection of low thermal impedance to the emitter recrystallized region in a transistor in a manner which will be apparent from the foregoing. For example, in one simple and effective form of the invention, provision of both emitter and collector connections may be accomplished by performing substantially identical procedures simultaneously upon both active elements. It will also be understood that the process of the invention may be applied to germanium N-P-N transistors, silicon P-N-P or N-P-N transistors, diodes or the like.

While the invention has been described with particular reference to specific embodiments thereof, it may be embodied in a variety of forms differing from those described in detail hereinbefore, without departing from the scope of the invention.

I claim:

1. In a method for providing an intimate thermal connection between a region of a semiconductive body initially underlying an external, metal portion of an alloy-junction contact to said body and an initially separate body of low thermal impedance, said body of low thermal impedance having an end surface of shape and size to fit within the periphery of and against said underlying region without engaging other adjacent portions of said semiconductive body and having a lateral surface extending away from said end surface and so shaped as to avoid touching said other adjacent portions of said semiconductive body when said end surface is positioned against said underlying region and entirely within said periphery thereof, the steps of: applying to said end surface a body of a first material having a melting point below that of the material of said metal portion and in which said material of said metal portion is readily soluble when said first material is molten; coating said lateral surface of said body of low thermal impedance with a substance rendering said lateral surface readily wettable by said material of said metal portion; placing said metal portion and said body of said first material applied to said end surface in contact with each other; urging said underlying region of said semiconductive body and said end surface toward each other; and heating said body of said first material and said metal portion sufficiently to liquefy said body of said first material and said metal portion, whereby said end surface of said body of low thermal impedance is moved gently to a position closely adjacent said underlying region as said first material dissolves said metal portion and as said material of said metal portion is drawn off onto said lateral surface.

2. A method in accordance with claim 1, in which said semiconductive body comprises germanium and said external metal portion comprises indium, and in which said material with which said lateral surfaces are coated and said first material each comprise indium and a melting-point depressing material.

3. A method in accordance with claim 2 in which said melting-point depressing material is cadmium.

References Cited in the file of this patent

UNITED STATES PATENTS

| | | |
|---|---|---|
| 2,137,617 | Imes et al. | Nov. 22, 1938 |
| 2,409,668 | Dailey | Oct. 22, 1946 |
| 2,464,821 | Ludwick et al. | Mar. 22, 1949 |
| 2,725,315 | Fuller | Nov. 29, 1955 |
| 2,725,505 | Webster et al. | Nov. 29, 1955 |
| 2,730,663 | Harty | Jan. 10, 1956 |
| 2,877,396 | Armstrong | Mar. 10, 1959 |
| 2,906,930 | Raithel | Sept. 29, 1959 |